(12) United States Patent
Tang et al.

(10) Patent No.: US 9,007,750 B2
(45) Date of Patent: Apr. 14, 2015

(54) ELECTRONIC DEVICE HOUSING

(75) Inventors: Xue-Dong Tang, Shenzhen (CN); Wei Liu, Shenzhen (CN)

(73) Assignee: Zhongshan Innocloud Intellectual Property Services Co., Ltd., Zhongshzn (CN)

( * ) Notice: Subject to any disclaimer, the term of this patent is extended or adjusted under 35 U.S.C. 154(b) by 413 days.

(21) Appl. No.: 13/590,450

(22) Filed: Aug. 21, 2012

(65) Prior Publication Data

US 2013/0235513 A1 Sep. 12, 2013

(30) Foreign Application Priority Data

Mar. 9, 2012 (CN) .......................... 2012 1 0061077

(51) Int. Cl.
*H05K 5/00* (2006.01)
*H05K 7/00* (2006.01)
*G11B 17/04* (2006.01)

(52) U.S. Cl.
CPC .................................. *G11B 17/0405* (2013.01)

(58) Field of Classification Search
USPC ............... 361/679.01–679.09, 679.1–679.19, 361/679.21–679.29, 361/679.31–679.45, 361/679.55–679.6, 724–747; 248/917–924, 248/80–88, 155.1–155.5, 166–173, 248/180.1–186.2, 229.1–231.51, 271.4, 248/292.14, 316.1–316.8; 292/1–62, 113, 292/169.11–169.23, 341.11–341.19; 348/14.07, 51–52, 177, 348/333.01–333.13, 739
See application file for complete search history.

(56) References Cited

U.S. PATENT DOCUMENTS

| 2007/0177337 | A1* | 8/2007 | Sasaoka et al. | ................ 361/600 |
| 2010/0220433 | A1* | 9/2010 | Murata | ..................... 361/679.01 |
| 2012/0327570 | A1* | 12/2012 | Tang et al. | ................ 361/679.01 |

* cited by examiner

*Primary Examiner* — Jerry Wu
(74) *Attorney, Agent, or Firm* — Novak Druce Connolly Bove + Quigg LLP

(57) ABSTRACT

A housing of an electronic device includes a bottom cover and a front panel detachably secured to the bottom cover. The bottom cover includes at least one first sidewall and a locking portion perpendicularly set on the at least one first sidewall. The front panel includes a fixing portion and a blocking portion adjacent to the fixing portion and spaced from the locking portion. The fixing portion defines a through hole for receiving the locking portion. The fixing portion and the blocking portion abut opposite sides of the at least one first sidewall for preventing the at least one first sidewall from leaving a gap between the at least one first wall and the locking portion.

12 Claims, 5 Drawing Sheets

ELECTRONIC DEVICE HOUSING

BACKGROUND

1. Technical Field

The present disclosure relates to housing for electronic devices.

2. Description of Related Art

A housing for electronic devices, such as DVD players, includes a bottom cover, an upper cover covering on the bottom cover to form a casing defining an opening, and a front panel arranged in the opening to define a closed space with the bottom cover and the upper cover. The bottom cover includes a bottom plate and two sidewalls perpendicularly extended from the two opposite edges of the bottom plate. In assembly, the front panel is first secured to the bottom cover, and then, the upper cover is secured to the bottom cover. However, the bottom cover is easily deformed to define a gap between the front panel and upper cover. As a result, the dust and other contaminations may easily enter the electronic device.

Therefore, there is room for improvement in the art.

BRIEF DESCRIPTION OF THE FIGURE

The components of the drawings are not necessarily drawn to scale, the emphasis instead being placed upon clearly illustrating the principles of the embodiment of an electronic device. Moreover, in the drawings, like reference numerals designate corresponding parts throughout several views.

DETAILED DESCRIPTION

Embodiments of the present disclosure will now be described in detail with reference to the drawings.

Figure 1:
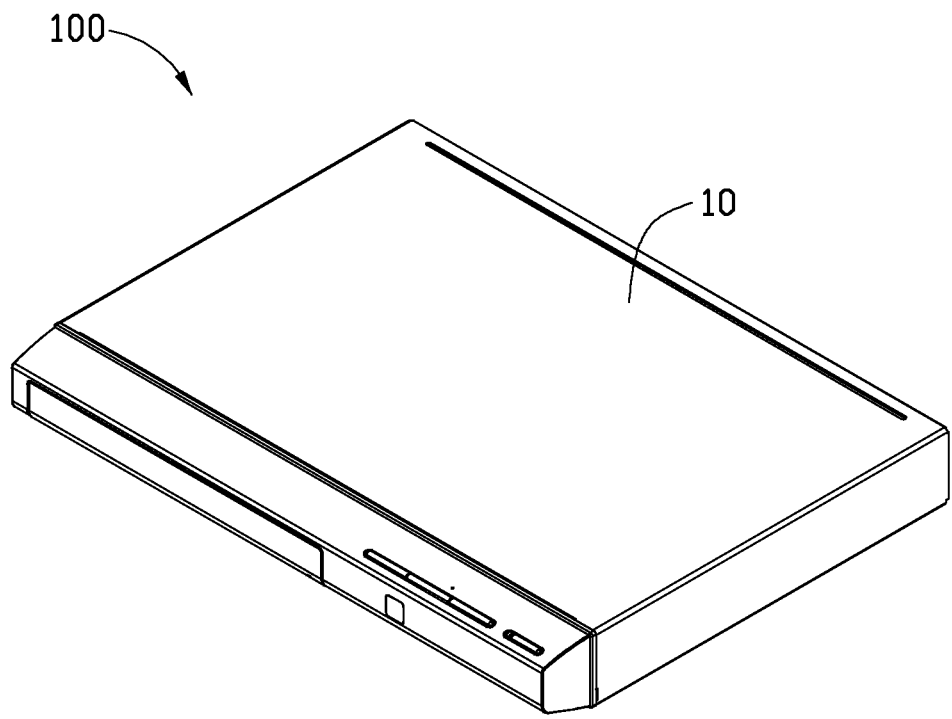
FIG. 1 is a schematic view of an electronic device, according to an embodiment; the electronic device includes an upper cover, a bottom cover, and a front panel.
Figure 2:
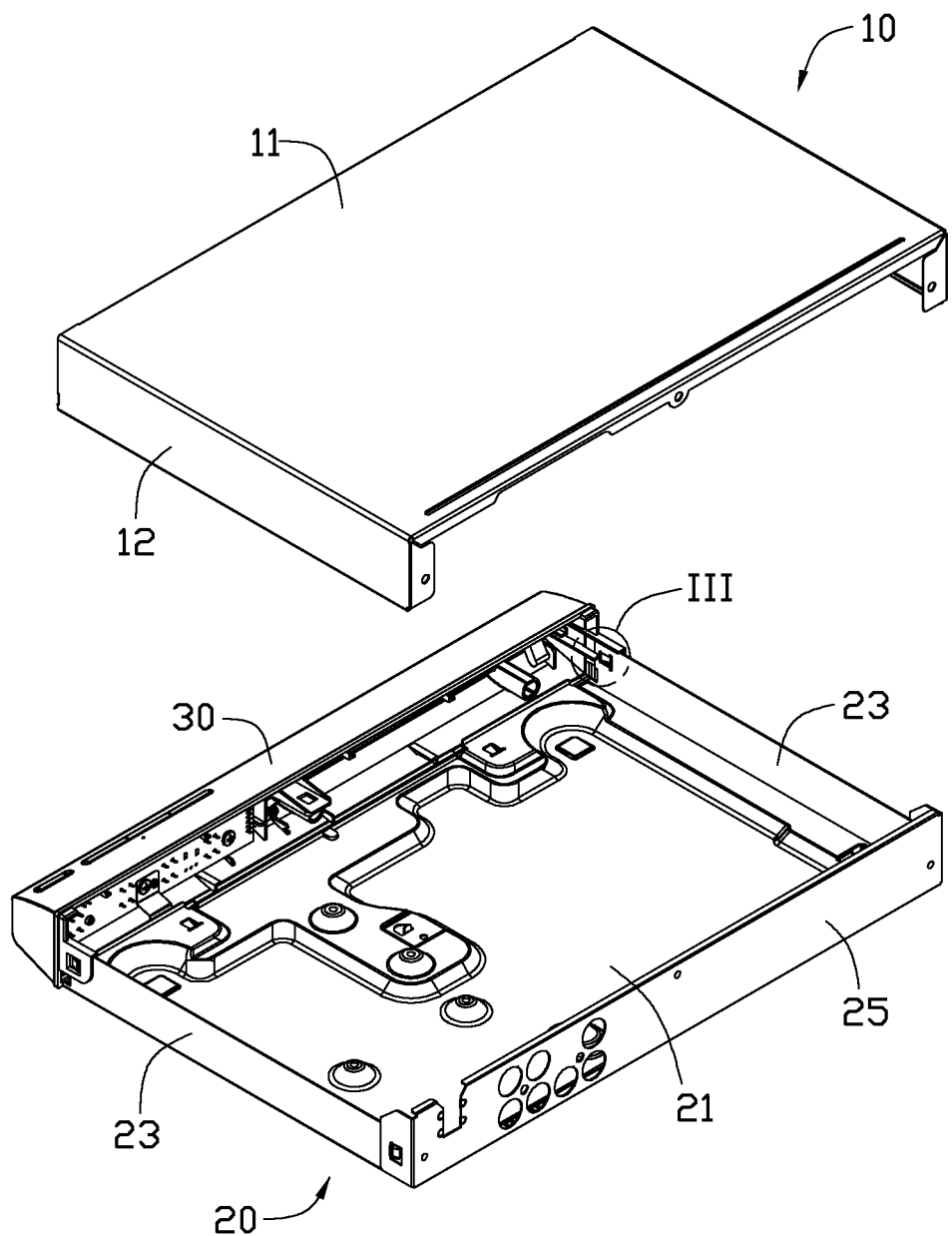
FIG. 2 is a partially disassembled view of the electronic device of FIG. 1.

Referring to FIGS. 1 and 2, an electronic device 100 of the embodiment is shown. The electronic device 100 includes an upper cover 10, a bottom cover 20 secured to the upper cover 10, and a front panel 30. The front panel 30 cooperates with the upper cover 10 and the bottom cover 20 to form a closed space (not labeled) for receiving electronic components of the electronic device 100. In the embodiment, the electronic device 100 is a portable DVD player.

The upper cover 10 includes a top plate 11 and two sidewalls 12. The top plate 11 is a substantially rectangular. The sidewalls 12 perpendicularly extend from opposite edges of the top plate 11.

The bottom cover 20 includes a bottom plate 21, opposite first sidewalls 23, and a second sidewall 25. The bottom plate 21 is a substantially rectangular and corresponds to the top plate 11. The first sidewalls 23 and the second sidewall 25 perpendicularly extend from three adjacent edges of the bottom plate 21. The first sidewalls 23 are parallel with each other and correspond to the sidewalls 12 respectively. The second sidewall 25 is parallel with the front panel 30 and connected to the ends of the first sidewalls 23 away from the front panel 30. In the embodiment, there are a plurality of holes (not labeled) defined on the first sidewalls 23 and the second sidewall 25.

Figure 3:
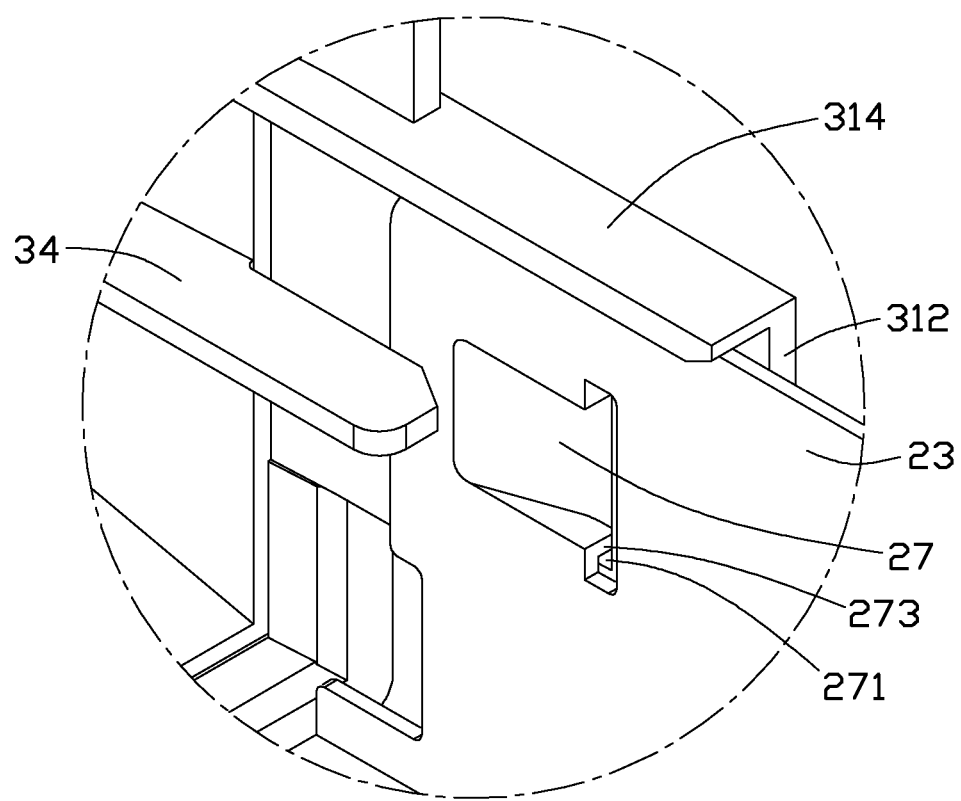
FIG. 3 is an enlarged view of section III of the electronic device of FIG. 2.
Figure 4:
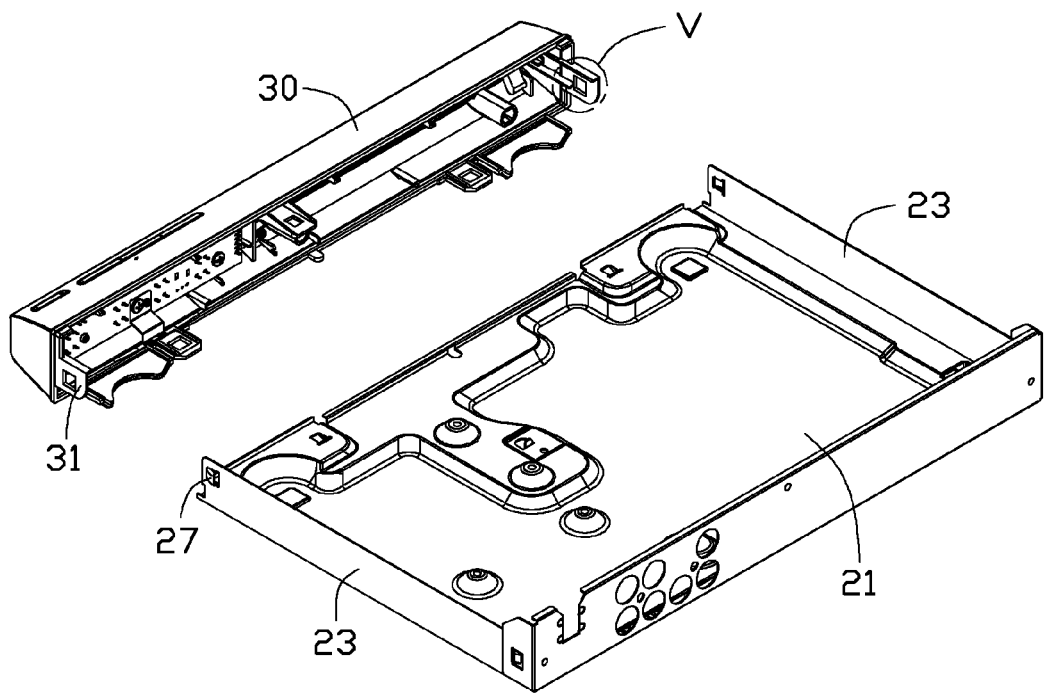
FIG. 4 is a partially disassemble view of FIG. 2 showing the bottom cover disengaged for the front panel.

Referring to FIGS. 3 and 4, an end of each first sidewall 23 away from the second sidewall 25 forms a locking portion 27. The locking portion 27 perpendicularly protrudes from the first sidewall 23 towards the outside of the electronic device 100. When viewed from the inner surface of the first sidewall 23, the locking portion 27 is recessed in the inner surface of the first sidewall 23; when viewed from the outer surface of the first sidewall 23, and the locking portion 27 is protruding out of the first sidewall 23. The locking portion 27 is substantially a hollow right-angled triangular prism. The two parallel base of the locking portion 27 are perpendicular to the first sidewall 23. The locking portion 27 defines a gap 271 for operating the locking portion 27 disassembled from the front panel 30. The edges of the locking portion 27 opposite to the second sidewall 25 perpendicularly extends from the first sidewall 23 to form an abutting portion 273 for securing the front panel 30. In the embodiment, the locking portions 27 are made of elastic material.

Figure 5:
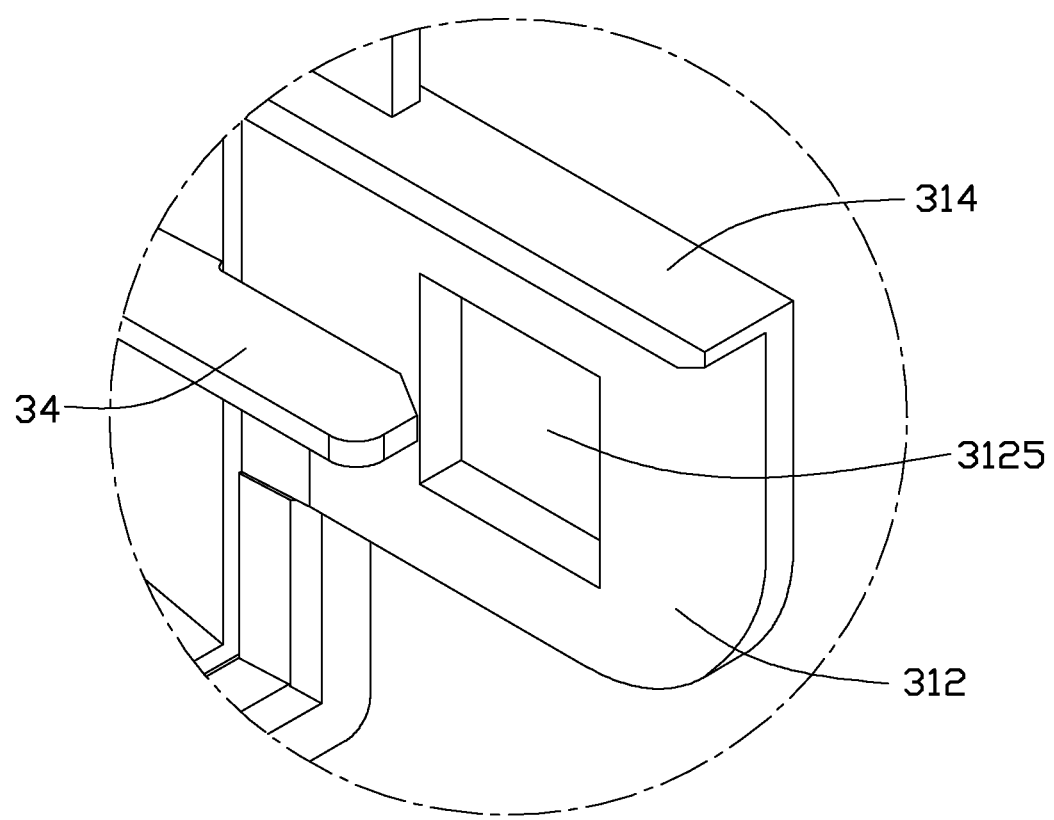
FIG. 5 is an enlarged view of section V of the electronic device of FIG. 4.

Referring to FIG. 5, the front panel 30 is substantially rectangular. The front panel 30 includes two fixing portions 31 (see FIG. 4) and two blocking portions 34. The fixing portions 31 are arranged at opposite ends of the front panel 30 and respectively correspond to the locking portions 27. The cross-section of the fixing portions 31 in a direction parallel with the front panel 30 is substantially L-shaped. Each of the fixing portions 31 includes a first rectangular plate 312 and a second rectangular plate 314. The first plate 312 is parallel with the first sidewall 23. The center of the first plate 312 defines a rectangular through hole 3125. The through hole 3125 receives and engages with the abutting portion 273 of the locking portions 27 respectively. The size of the through hole 3125 is slightly greater than the size of the locking portion 27. The second plate 314 perpendicularly bends from one edge of the first plate 312 and connects with the inner surface of the front panel 30. The second plate 314 functions as a rib for enhancing the stiffness of the first plate 312.

The blocking portions 34 are arranged adjacent to the fixing portion 31 respectively. The blocking portion 34 is substantially a rectangle plate. The blocking portion 34 perpendicularly extends from the inner surface of the front panel 30 and is spaced from the first plate 312 in a predetermined distance. The predetermined distance is substantially equal to the thickness of the first sidewall 23. The length of the blocking portion 34 is substantially equal to the distance between the edge of the through hole 3125 adjacent to the front panel 30 and the front panel 30, such that the blocking portion 34 does not expose via the through hole 3125 and does not baffle the first sidewall 23 moving out of the through hole 3125. In the embodiment, the blocking portion 34 is parallel with the second plate 314 and perpendicular to the first plate 312.

Referring again to FIG. 2, in assembly, the second plates 314 are disposed on the outer surface of the corresponding first sidewalls 23. By pushing, the locking portion 27 is elastically deformed to allow the locking portion 27 to be received in the through hole 3125, with the abutting portion 273 abutting an edge of the through hole 3125 away from the front panel 30. The end of the first sidewall 23 away from the second sidewall 25 is sandwiched between the blocking portion 34 and the first plate 312 with opposite surfaces abutting the first plate 312 and the blocking portion 34, to prevent the first sidewall 23 of the bottom cover 20 from leaving a gap between the first plate 312 and first sidewall 23. As a result, the front panel 30 is secured to the bottom cover 20.

After assembly, because the first sidewall 23 is locked to the first plate 312 via the through hole 3125, the first sidewall 23 is prevented from moving in a direction perpendicular to the second plate 25. Because an end of each first sidewall 23 away from the second sidewall 25 is sandwiched between the fixing portion 31 and the blocking portion 34, the first sidewall 23 is prevented from moving in a direction parallel with the second plate 25.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A housing of an electronic device, comprising: a bottom cover comprising at least one first sidewall; a front panel detachably secured to the bottom cover; and a locking portion perpendicularly set on the at least one first sidewall; wherein the front panel comprises a fixing portion defining a through hole for receiving the locking portion and a blocking portion adjacent to and spaced from the fixing portion; the fixing portion and the blocking portion abut opposite surface of the at least one first sidewall for preventing the at least one first sidewall from leaving a gap between the first sidewall and the locking portion; and the blocking portion perpendicularly extended from the inner surface of the front panel; the length of the blocking portion is equal to the distance between the front panel and an edge of the through hole adjacent to the front panel.

2. The housing of claim 1, wherein the fixing portion comprises a first plate and a second plate; the first plate is parallel with the at least one first sidewall; the second plate perpendicular bents from one edge of the first plate and connects with the inner surface of the front panel; the through hole is disposed on the first plate.

3. The housing of claim 2, wherein the blocking portion is parallel with the second plate and perpendicular to the first plate.

4. The housing of claim 1, wherein the locking portion is set on the outer surface of the at least one first sidewall.

5. The housing of claim 1, wherein the locking portion is a hollow right-angled triangular prism and made of elastic material.

6. The housing of claim 5, wherein edges of the locking portion opposite to a second sidewall perpendicularly extends from the first sidewall to form an abutting portion for securing the front panel.

7. An electronic device, comprising: a housing with a bottom cover comprising at least one first sidewall; a front panel detachably secured to the bottom cover; and a locking portion perpendicularly set on the at least one first sidewall; wherein the front panel comprises a fixing portion defining a through hole for receiving the locking portion and a blocking portion adjacent to and spaced from the fixing portion; the fixing portion and the blocking portion abut opposite surface of the locking portion for preventing the at least one first sidewall moving in a direction parallel with the front panel; and the fixing portion comprises a first plate and a second plate; the first plate is parallel with the at least one first sidewall; the second plate perpendicular bents from one edge of the first plate and connects with the inner surface of the front panel; the through hole is disposed on the first plate.

8. The electronic device of claim 7, wherein the blocking portion perpendicularly extends from the inner surface of the front panel; the length of the blocking portion is equal to the distance between the front panel and an edge of the through hole adjacent to the front panel.

9. The electronic device of claim 8, wherein the blocking portion is parallel with the second plate and perpendicular to the first plate.

10. The electronic device of claim 7, wherein the locking portion is set on the outer surface of the at least one first sidewall.

11. The electronic device of claim 7, wherein the locking portion is a hollow right-angled triangular prism and made of elastic material.

12. The electronic device of claim 11, wherein edges of the locking portion opposite to the second sidewall perpendicularly extends from the first sidewall to form an abutting portion for securing the front panel.

* * * * *